United States Patent [19]

Fotland et al.

[11] 4,408,214

[45] Oct. 4, 1983

[54] THERMALLY REGULATED ION GENERATION

[75] Inventors: Richard A. Fotland, Holliston; Leo A. Beaudet, Milford, both of Mass.

[73] Assignee: Dennison Manufacturing Company, Framingham, Mass.

[21] Appl. No.: 295,941

[22] Filed: Aug. 24, 1981

[51] Int. Cl.[3] .......................... G01D 15/06; H01J 7/24; H05B 31/26

[52] U.S. Cl. .................................... 346/159; 250/426; 315/111.81

[58] Field of Search ................ 346/159; 250/426, 326; 313/211, 212, 217, 220; 315/111.8, 111.9; 361/229, 230

[56] References Cited

U.S. PATENT DOCUMENTS

| | | | |
|---|---|---|---|
| 3,665,181 | 5/1972 | Cobb | 361/230 X |
| 4,155,093 | 5/1979 | Fotland et al. | 346/159 |

*Primary Examiner*—Thomas H. Tarcza
*Attorney, Agent, or Firm*—Arthur B. Moore

[57] ABSTRACT

Method and apparatus for ion generation with enhanced performance through operation at elevation temperatures. A glow discharge ion generator is subjected to extrinsic heating, both preliminarily and during continued operation, thereby providing increased ion current outputs. Such thermal control additionally prolongs the life of the ion generator by reducing corrosion and contaminant buildup.

20 Claims, 3 Drawing Figures

THERMALLY REGULATED ION GENERATION

BACKGROUND OF THE INVENTION

The present invention relates to the generation of ions, and more particularly to the generation of ions with increased output currents over a prolonged period.

Ions can be generated in a wide variety of ways. Common techniques include the use of air gap breakdown, corona discharges, and spark discharges. Other techniques employ triboelectricity, radiation (alpha, beta, and gamma as well as x-rays and ultraviolet light), and microwave breakdown.

When utilized for the formation of latent electrostatic image, all of the above techniques suffer certain limitations in ion output currents and charge image integrity. A further approach which offers significant improvement in this regard is described in U.S. Pat. No. 4,155,093 and the improvement patent U.S. Pat. No. 4,160,257. These patents disclose method and apparatus for ion generating involving what the inventors term "glow discharge". This is accomplished through the application of a high voltage time-varying potential between two electrodes separated by a solid dielectric member. As disclosed in U.S. Pat. No. 4,155,093, the varying potential causes the formation of a pool of positive and negative ions in an air region adjacent an edge surface of one of the electrodes, which ions may be extracted to form a latent electrostatic image. U.S. Pat. No. 4,160,257 discloses the use of an additional electrode to screen the extraction of ions, providing an electrostatic lensing action and preventing accidental image erasure.

In the preferred embodiment of the ion generation apparatus discussed above, the solid dielectic member comprises a sheet of mica. An advantageous method for fabricating such devices is disclosed in U.S. Pat. No. 4,381,327. A mica sheet is bonded to metal foils using pressure sensitive adhesive, and the metal foils etched in a desired electrode pattern. This fabrication provides excellent ion output currents and reasonable service life. Such devices, however, are commonly exposed to atmospheric environmental substances and byproducts of the ion generation process, which contributes to corrosion thereof. This apparatus also suffers the tendency to accumulate contaminants at the ion generation sites. Such contaminant buildup and corrosion seriously reduce the service life of these devices.

Accordingly, it is a primary object of the invention to provide improved ion generation using a glow discharge ion generator. A related object is to achieve a method which is compatible with a glow discharge ion generator incorporating a mica dielectric.

Another object of the invention is to attain enhanced ion current outputs. A related object is the formation of latent electrostatic images at higher speeds and with lower drive voltage requirements.

A further object of the invention is the achievement of prolonged service life in ion generators of the glow discharge type. A related object is the reduction of contaminant buildup during ion generation. Yet another related object is diminished corrosion of such devices.

SUMMARY OF THE INVENTION

In fulfilling the above and additional objects of the invention, an ion generator of the glow discharge type is subjected to extrinsic heating to provide increased ion currents with improved image integrity. An ion generator consisting of a plurality of electrodes at opposite sides of a solid dielectric is subjected to high voltage varying potentials in order to create glow discharges, while simultaneously heating the device to a prescribed temperature. In the preferred embodiment, the solid dielectric member is comprised of mica.

In accordance with one aspect of the invention, the glow discharge device is heated during the operation of the device. The device is preferably pretreated by operation at an elevated temperature prior to regular operation of the device. The ion generator may be heated over an extended period to provide continuing improvements in ion current output and service life.

Another aspect of the invention is seen in the regulation of the elevated temperature in order to provide a calibrated heating of the ion generator. In the preferred embodiment, the glow discharge device is heated to a temperature in the range 130° F.–270° F., most advantageously around 150° F.

The use of elevated temperatures in the operation of glow discharge devices has been observed to lead to significantly higher output currents, even when the external heat source is subsequently removed. This technique also achieves marked reductions in contaminant buildup, and in the formation of corrosive substances adjacent the glow discharge device.

BRIEF DESCRIPTION OF THE DRAWINGS

The above and additional aspects of the invention are illustrated in the detailed description of the invention which follows, taken in conjunction with the drawings in which.

DETAILED DESCRIPTION

In the preferred embodiment of the invention, ion generation apparatus of the type disclosed in U.S. Pat. No. 4,160,257 is modified by the incorporation of thermal control apparatus. During the normal operation of the apparatus disclosed in this patent, such devices generate internal heat due to the imposition of high voltage, high frequency alternating potentials between electrodes on opposite sides of a solid dielectric. With typical operating parameters such as those described below in Example 2, the ion generator will be naturally heated to a temperature on the order of 120° F. In the ion generating method of the invention, this heating effect is supplemented by exposing the ion generator to an additional heat source.

Advantageously, the ion generator is heated to a temperature in the range 130° F.–270° F., most preferably around 150° F. To be effective in accomplishing the advantages discussed below, such heating should be effected during the generation of glow discharges through the use of high voltage time-varying potentials.

Figure 1:
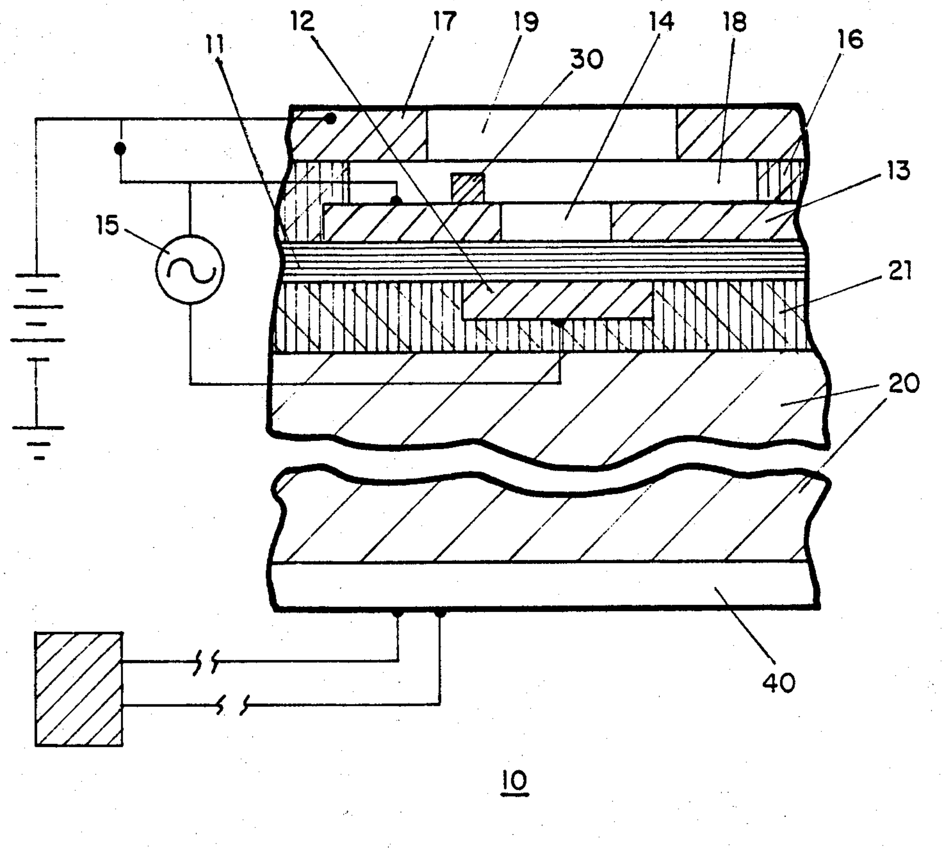
FIG. 1 is a sectional schematic view of extrinsically heated ion generation apparatus in accordance with the preferred embodiment.

FIG. 1 shows in section an illustrative ion generator 10 of the type disclosed in U.S. Pat. No. 4,160,257, including thermal control apparatus in accordance with the present invention. The ion generator 10 includes a driver electrode 12 and a control electrode 13, separated by a solid dielectric layer 11. The preferred dielectric material is mica, which may be fabricated in sufficiently thin films to avoid undue demands on the driving electronics, and which is less vulnerable to deterioration due to byproducts of the ion generation process. Especially preferred is Muscovite mica, $H_2KAl_3(SiO_4)_3$. A source 15 of alternating potential between electrodes 12 and 13 induces an air gap breakdown in the aperture 14, generating a pool of ions of both polarities.

A third, screen electrode 17 is separated from the control electrode by a second dielectric layer 16. Advantageously, the second dielectric layer 16 defines an air space 18 which is substantially larger than the aperture 14 in the control electrode. This is necessary to avoid wall charging effects. The screen electrode 17 contains an aperture 19 which is at least partially positioned under the aperture 14. Ions are extracted from the air gap breakdown in aperture 14 using the control potential $V_C$ to control electrode 13. A screen potential $V_S$ is applied to screen electrode 17 to regulate this extraction of ions.

Optionally, the ion generator 10 further includes a mounting block 20 adjacent the driver electrode 12 to control heat buildup in ion generator 10. In the illustrated embodiment, the mounting block 20 consists of a metal such as aluminum or stainless steel with a flat mounting surface. In this instance, the ion generator laminate 10 further includes a thin, electrically insulative layer 21 to electrically isolate the driver electrode 12 from mounting block 20.

The ion generator 10 incorporates an electric heater 40 in order to heat the various structures. This heating may be controlled through the use of a thermocouple 30, which monitors local temperature variances and acts as a thermostat for heater 40. It is not essential, however, to monitor temperatures when utilizing a reasonably accurate heating element 40.

In the illustrated embodiment, the electric heater 40 is placed adjacent mounting block 20, and transmits heat to the core structures through this block and through electrically insulative layer 21. This placement may be modified for convenience of construction; the power requirements of heater 40 will depend on its location. The heater may even be located in a separate structure, with a thermally conductive connection to generator 10. As depicted in FIG. 1, the thermocouple 30 is appended to control electrode 13. This location provides precise monitoring of the pertinent temperature. The positioning of thermocouple 30 may be modified for engineering convenience, with some sacrifice in accuracy if this device is remote from the ion generation sites.

Figure 2:
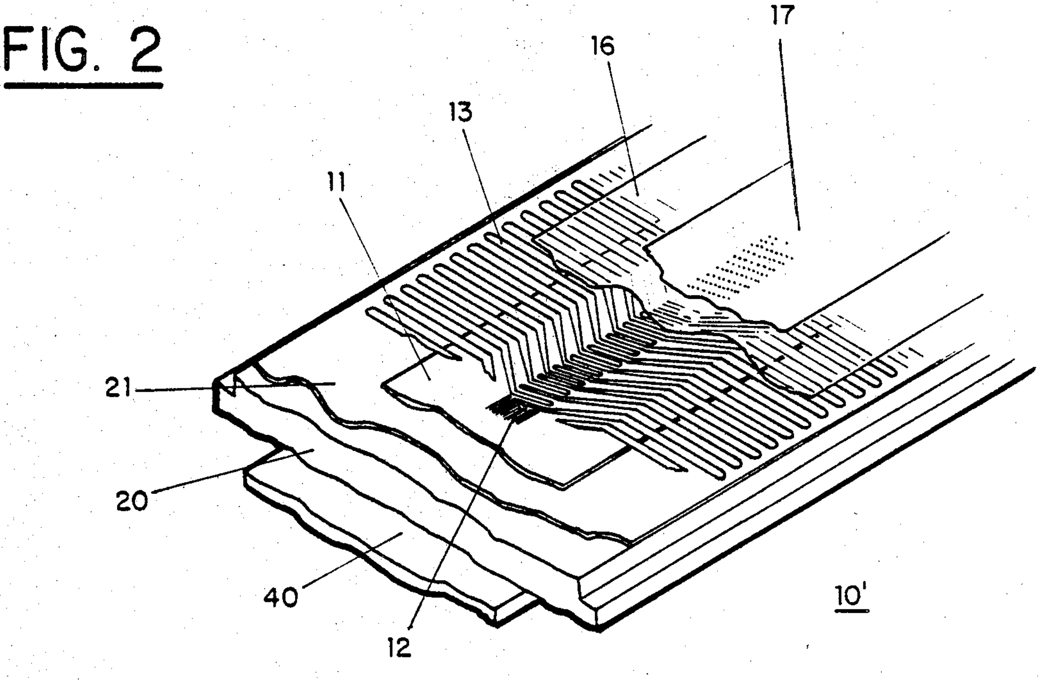
FIG. 2 is a cutaway perspective view of a dot matrix imaging device of the type illustrated in FIG. 1.

In a preferred version of the ion generating apparatus 10, such apparatus is configured as a multiplexible dot matrix imaging device 10' as shown in the cutaway view of FIG. 2. The ion generator 10' comprises a series of finger electrodes 13 and a cross series of selector bars 12 with an intervening dielectric layer 11. Ions are generated at apertures 14 in the finger electrodes at matrix crossover points; the extraction of these ions is controlled by screen electrode 17 with screen apertures 19. The ion generator 10' is mounted to metallic block 20.

The imaging device 10' of FIG. 2 is advantageously incorporated in an electrostatic transfer printer of the type disclosed in U.S. Pat. No. 4,267,556. Ions extracted from the apertures 14 are screened through apertures 19 to form an electrostatic image on the dielectric surface of an imaging cylinder.

The ion generating apparatus 10 provides a number of significant advantages over the prior art. The primary advantage is that of a marked increase in ion output currents; typically, these currents increase by a factor of 2–3 or more. This effect is enhanced by the continued operation of the apparatus at elevated temperatures. Such increases occur after a period of operation at elevated temperatures even when the temperature is later reduced; i.e. the output current will be significantly higher than that encountered in apparatus continually operated at the reduced temperature. See Example 2.

For best results, the ion generator of the invention is pretreated by operation at elevated temperatures for a period. The increased output currents attributable to the invention allow the use of lower driving voltages, and permit significant improvements in the speed of operation of electrostatic imaging devices embodying the invention, such as apparatus of the type disclosed in U.S. Pat. No. 4,267,556.

A second result of this technique is an inhibited formation of contaminant substances at or near the ion generation sites. Prominent among these substances is ammonium nitrate, which tends to form as imperfect white crystals. With further reference to FIG. 1, in ion generator 10, contaminants will tend to accumulate in and around control aperture 14 and screen aperture 19. In the case of dot matrix apparatus such as that shown in FIG. 2, the contaminant formation if unchecked will cause spurious dots in the electrostatic image, as well as nonuniformities in the image. In the embodiment in which such an ion generator is used to form a latent electrostatic image on a contiguous dielectric imaging member, as in U.S. Pat. No. 4,267,556, there is the additional danger of contaminent buildup on the imaging member. In such instances, it may be advisable to include additional heaters adjacent the dielectric imaging member.

A third characteristic of the invention is a significant reduction in the incidence of corrosive substances formed during the ion generation process. Such substances typically include nitric acid and oxalic acid.

The invention is further illustrated in the following nonlimiting examples:

EXAMPLE 1

An ion generator 10' as illustrated in FIG. 2 was fabricated as follows: a sheet of mica having a thickness of about 25 microns was cleaned using lint-free tissues and methyl ethyl ketone (MEK). After drying, the mica sheet was suspended from a dipping fixture and lowered into a bath of pressure sensitive adhesive consisting of a silicon-based pressure adhesive formulation until all but two millimeters was submerged. The mica was then withdrawn from the adhesive bath at the speed of two centimeters per minute, providing a layer of adhesive approximately three microns in thickness. The coated mica was stored in a dust-free jar and placed in a 150° C. oven for five minutes in order to cure the pressure sensitive adhesive.

Two sheets of stainless steel 25 microns thick were cut to the desired dimensions and cleaned using MEK and lint-free tissues. One of the sheets was placed in a registration fixture, followed by the coated mica and the second foil sheet. Bonding was effected by application of light finger pressure from the middle out to the edges, followed by moderate pressure using a rubber roller. Any adhesive remaining on exposed mica surfaces was removed using MEK and lint-free tissues. The edges of the lamination were then covered with a 0.6 millimeter coated Kapton tape coated with the pressure sensitive adhesive formulation. The foil layers were respectively etched in the patterns of electrodes 12 and 13 (FIG. 2) using a positive photoresist.

The laminate was returned to the registration fixture, which was then placed in a screen printer having a pattern corresponding to finger electrodes 13 of FIG. 2. The screen printer was employed to create a pattern of glass dielectric spacers 16. A continuous stainless steel foil 17 was then inserted in the registration fixture and its apertures 19 aligned with the apertures 14 using a microscope. The laminate was then set aside for a number of hours to cure. A thermocouple was mounted to screen electrode 17 with pressure sensitive tape.

The laminate was inverted, and a 100 micron layer of G-10 engineering thermoplastic applied to its drive electrode face. This structure was in turn bonded to an aluminum mounting block using pressure sensitive adhesive. A 100 watt heating plate 40 was affixed to the aluminum mounting block. The thermocouple monitored temperatures of the active region of the head to regulate the operation of heating plate 40.

EXAMPLE 2

An ion generator was constructed as described in Example 1.

The complete print head consisted of an array of 16 drive lines 12 and 96 control electrodes 13 which formed a total of 1536 crossover locations. Corresponding to each crossover location was a 0.006" etched hole in the screen electrode. Bias potentials of the various electrodes were as follows:

| | |
|---|---|
| Screen Potential $V_S$ | −600 volts |
| Control Electrode Potential $V_C$ | −300 volts |
| (during the application of a −400 volt extraction pulse this voltage becomes −700 volts) | |
| Driver Electrode Bias with respect to screen potential | +300 volts |

The DC extraction voltage was supplied by a pulse generator with a print pulse duration of 10 microseconds. Charge image formation occured only when there was simultaneously a pulse of −400 volts to the finger electrodes 13, and an alternating potential of two kilovolts peak-to-peak at a frequency of 1 MHz supplied by the finger electrodes 13 and drive lines 12.

The ion generation was maintained at a spacing of 8 mils from a dielectric cylinder in apparatus of the type disclosed in U.S. Pat. No. 4,267,556. Heaters were installed adjacent the dielectric cylinder to maintain the cylinder at 105° C. This printer was run over an extended period, while monitoring the ion current to the screen electrode 17. Periodically, developed print samples produced by this printing apparatus were examined for image integrity.

Figure 3:
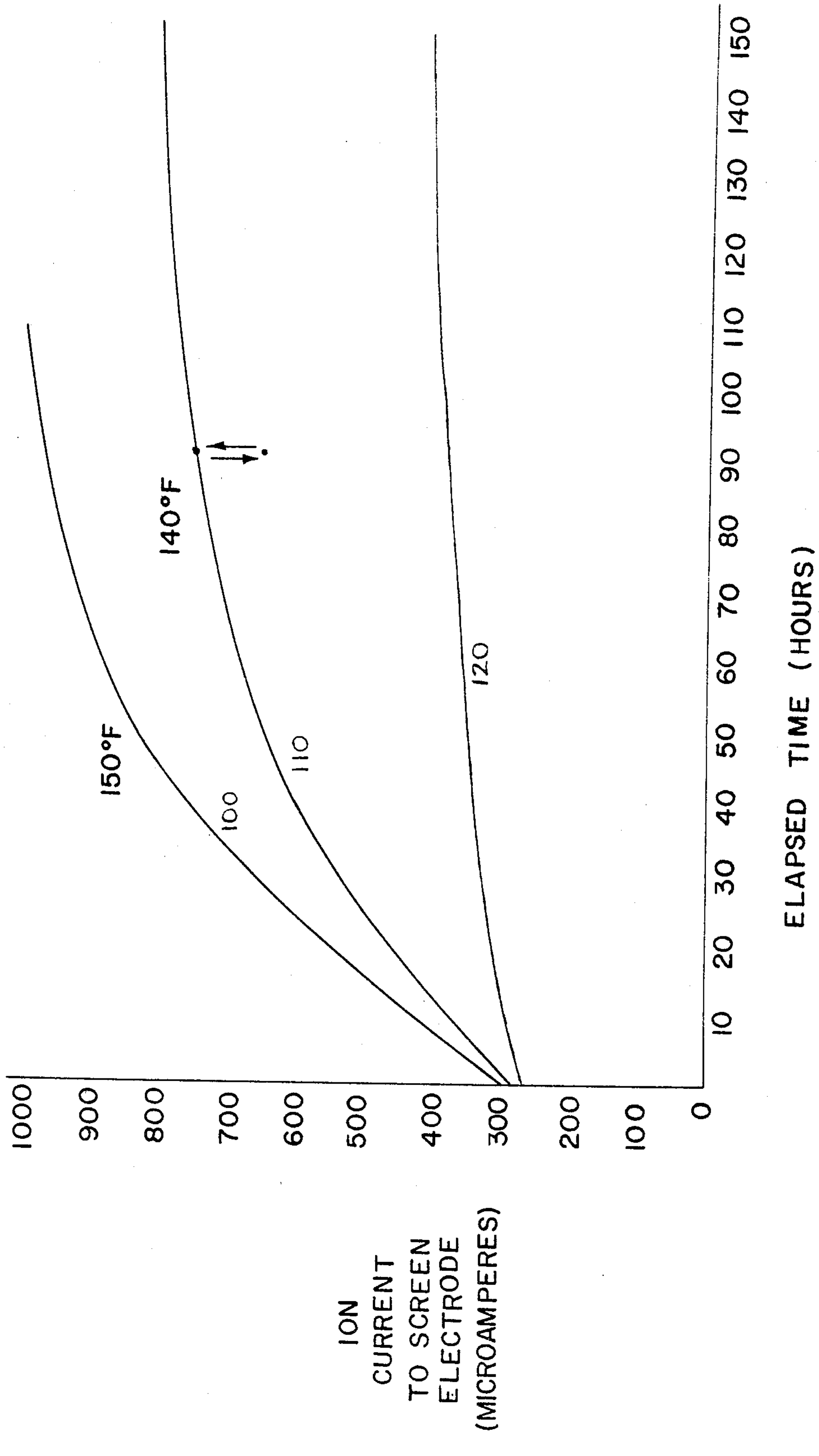
FIG. 3 is a plot of ion current output as a function of operating time for ion generators of the type shown in FIG. 2.

FIG. 3 gives a plot of the current measured at the screen electrode over time. Curve 100 represents the values measured for an ion generator heated to 150° F. Curve 110 represents the values measured for an ion generator heated to 140° F. In the latter case, the temperature was briefly reduced to 120° F. at around 90 hours, at which point the current fell to 450 microamperes. For purposes of comparison, curve 120 represents values measured for an ion generator with no extrinsic heating.

Print samples produced by the ion generator heated to 140° F. and 150° F. remained uniform with clean background at 100 hours. It was observed that acceptable print quality was achieved even when lowering the control voltage to −250 volt pulses. Print samples produced from the unheated ion generator showed weak and missing dots, and background streaks.

EXAMPLE 3

An ion generator was constructed as described in Example 1. The ion generator was placed for 1 hour in an oven heated to 212° F., with no potentials applied. The print quality and ion current were compared before and after heating and were virtually unaffected.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

We claim:

1. A method of generating ions, comprising the steps of:

applying a time-varying potential between a glow discharge device comprising a plurality of electrodes separated by a solid dielectric member, to generate ions in an air region at a junction of at least one of the electrodes and the solid dielectric member, and heating the glow discharge device to an elevated temperature above the intrinsic operating temperature of said device.

2. A method as defined in claim 1 wherein the heating step comprises heating the glow discharge device to a temperature in the range 130° F.-270° F.

3. A method as defined in claim 2 wherein the heating step comprises heating the glow discharge device to about 150° F.

4. A method as defined in claim 1 further comprising the step of extracting ions from said air region.

5. A method as defined in claim 4 wherein the applying and heating steps are effected for a period prior to initiating the extracting step.

6. A method as defined in claim 4 further comprising the step of applying the extracted ions to a further member to form an electrostatic image.

7. Improved apparatus for generating ions comprising a glow discharge device of the type including a solid dielectric member; a plurality of electrodes separated by the solid dielectric member, with an air region adjacent the junction of at least one of the electrodes and the solid dielectric member; and means for applying a time-varying potential between the electrodes to generate ions in the air region;

wherein the improvement comprises means for heating the glow discharge device to an elevated temperature above the intrinsic operating temperature of said device.

8. Apparatus as defined in claim 7, wherein the elevated temperature comprises a temperature in the range 130° F.-270° F.

9. Apparatus as defined in claim 8, wherein the elevated temperature comprises about 150° F.

10. Apparatus as defined in claim 7, wherein the solid dielectric member is comprised of mica.

11. Apparatus as defined in claim 10, wherein the solid dielectric member is comprised of Muscovite mica.

12. Apparatus as defined in claim 7 of the type further comprising means for extracting ions from said air region.

13. Apparatus as defined in claim 12 further comprising means for forming a latent electrostatic image on a further member with the extracted ions.

14. Improved apparatus for generating ions comprising a glow discharge device of the type including a solid dielectric member; first and second electrodes contacting opposite sides of the solid dielectric member, the first electrode including an edge surface; and means for applying a time-varying potential between the electrodes to generate ions in an air region adjacent the junction of the first electrode and the solid dielectric member;

wherein the improvement comprises means for heating the glow discharge device to an elevated temperature above the intrinsic operating temperature of said device.

15. Apparatus as defined in claim 14, wherein the elevated temperature comprises a temperature in the range 130° F.-270° F.

16. Apparatus as defined in claim 15, wherein the elevated temperature comprises about 150° F.

17. Apparatus as defined in claim 14 wherein the solid dielectric member is comprised of mica.

18. Apparatus as defined in claim 17 wherein the solid dielectric member is comprised of Muscovite mica.

19. Apparatus as defined in claim 14 of the type further comprising means for extracting ions from said air region.

20. Apparatus as defined in claim 19 further comprising means for forming a latent electrostatic image on a further member with the extracted ions.

* * * * *